(12) United States Patent
Xu et al.

(10) Patent No.: US 11,487,837 B2
(45) Date of Patent: Nov. 1, 2022

(54) METHOD FOR SUMMARIZING MULTIMODAL CONTENT FROM WEBPAGES

(71) Applicant: Searchmetrics GmbH, Berlin (DE)

(72) Inventors: Fang Xu, Berlin (DE); Marcus Tober, Berlin (DE)

(73) Assignee: Searchmetrics GmbH, Berlin (DE)

( * ) Notice: Subject to any disclaimer, the term of this patent is extended or adjusted under 35 U.S.C. 154(b) by 346 days.

(21) Appl. No.: 16/580,173

(22) Filed: Sep. 24, 2019

(65) Prior Publication Data

US 2021/0089605 A1    Mar. 25, 2021

(51) Int. Cl.
| | | |
|---|---|---|
| *G06F 16/95* | (2019.01) | |
| *G06F 16/9538* | (2019.01) | |
| *G06F 17/16* | (2006.01) | |
| *G06F 16/951* | (2019.01) | |

(52) U.S. Cl.
CPC ........ *G06F 16/9538* (2019.01); *G06F 16/951* (2019.01); *G06F 17/16* (2013.01)

(58) Field of Classification Search
CPC .................. G06F 16/95385; G06F 16/9538
See application file for complete search history.

(56) References Cited

U.S. PATENT DOCUMENTS

| | | | | |
|---|---|---|---|---|
| 10,783,192 B1* | 9/2020 | Soubbotin | ......... | G06F 16/24556 |
| 2003/0154077 A1* | 8/2003 | Tahara | ................... | G10L 15/10 704/239 |
| 2005/0267734 A1* | 12/2005 | Masuyama | ............. | G06F 40/45 704/2 |
| 2007/0073745 A1* | 3/2007 | Scott | ..................... | G06F 16/374 |
| 2008/0027926 A1* | 1/2008 | Diao | ..................... | G06F 16/345 |
| 2012/0278300 A1* | 11/2012 | Soubbotin | ............. | G06F 16/338 707/706 |
| 2017/0364587 A1* | 12/2017 | Krishnamurthy | ..... | G06F 40/284 |
| 2018/0052929 A1* | 2/2018 | Liu | ........................ | G06F 16/951 |
| 2018/0107684 A1* | 4/2018 | Kiapour | ................ | G06F 16/164 |
| 2019/0042551 A1* | 2/2019 | Hwang | ................ | G06N 3/0454 |
| 2019/0279073 A1* | 9/2019 | Adibowo | ............. | G06N 3/0427 |
| 2020/0356592 A1* | 11/2020 | Yada | ....................... | G06F 40/20 |
| 2020/0372073 A1* | 11/2020 | Dahl | ..................... | G06K 9/6253 |
| 2021/0064657 A1* | 3/2021 | Gopalan | ............... | G06F 16/901 |
| 2021/0064700 A1* | 3/2021 | Gopalan | ................ | G06N 20/00 |
| 2021/0065417 A1* | 3/2021 | Hartfiel | ............. | G06K 9/00476 |

\* cited by examiner

*Primary Examiner* — Mohammad S Rostami
(74) *Attorney, Agent, or Firm* — Millen, White, Zelano & Branigan, P.C.; William Nixon; Wan-Ching Montfort

(57) ABSTRACT

The present invention generally relates to a method for summarizing content related to a keyword, the content being retrieved from online websites, the method comprising the steps of: searching (1100) the keyword with at least one search engine, thereby obtaining ranked result webpages, deriving (1200, 2200) sentences from a predetermined number of highest ranking webpages, among the ranked result webpages, combining (1300) the sentences, thereby obtaining a combined content, ranking (1400, 3400) the combined content, thereby obtaining a ranked content, outputting (1500) a predetermined number of highest ranking sentences from the ranked content as summary of the keyword.

1 Claim, 3 Drawing Sheets

Fig. 6

3450

Figure 1:
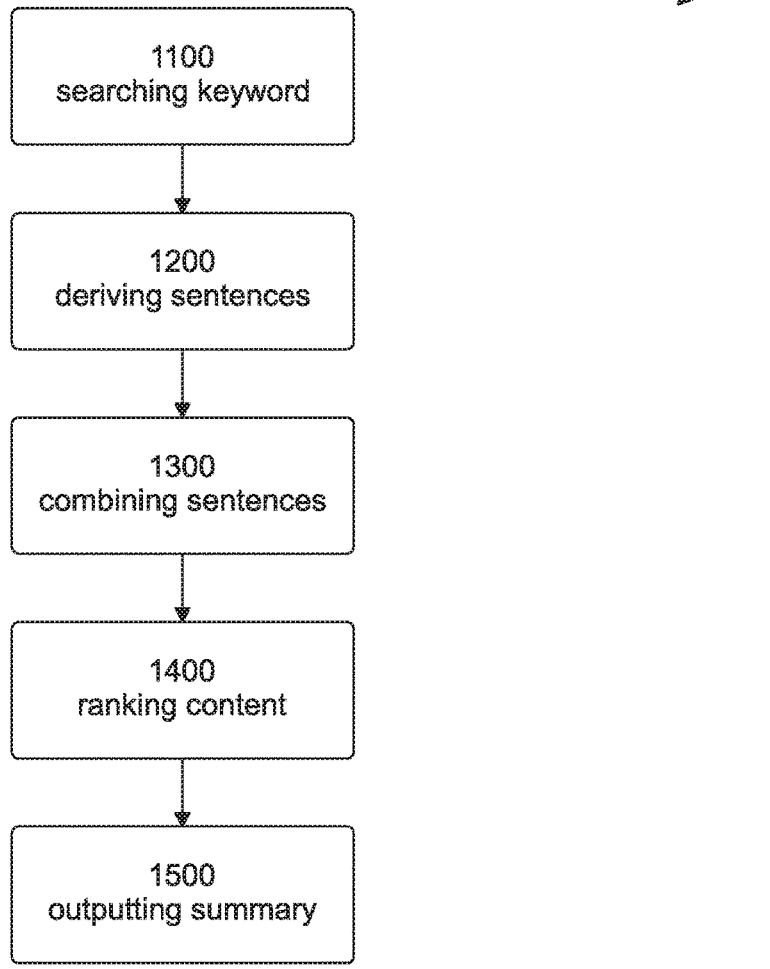

(Eq. 1) $\quad S\square_k = \sqrt{\dfrac{\sum_{i=1}^{n} \square u \square_{k,i}^2 \cdot \sigma \square_i^2}{length(S\square_k)}}$ (Eq. 2) $\quad s\square_k = S\square_k \cdot \sum_{i=0, i \neq k}^{n} \square wmd(k,i)/n$

METHOD FOR SUMMARIZING MULTIMODAL CONTENT FROM WEBPAGES

The present invention generally relates to a method for summarizing content. More specifically, it allows a summary to be generated for a given keyword based on multimodal content such as texts and images retrieved from a database.

PRIOR ART

Several kinds of websites need to be constantly updated with trendy and up-to-date content in order to attract clients or visitors. This is the case, for instance, of news websites, which regularly need to create new content to make sure customers regularly browse the website, thereby creating revenues, for instance through paid advertisement space. It could also be the case, for instance, of retail websites, which regularly need to update the items on offer and their description.

The person in charge of creating or updating the content of a website is generally referred to as content creator. When the content creator needs to create or update a webpage, for instance for a new piece of news or a description for a new article for sale, the content creator is usually faced with the problem deciding what content should be included in the page in order to attract traffic. As an example, if the new page relates to a new "café racer" motorcycle model from a given company and the content creator has little knowledge about motorcycles, or what a "café racer" is at all, the content creator is faced with the problem of what to write which may be of interest to potential clients. This may happen, for instance, for large retailers where a few content creators have to regularly create or update pages related to thousands of different articles and cannot be expected to be an expert in each field. Furthermore, even if the content creator is an expert in the field concerning the given item, it is difficult to estimate which content will generate a high visibility in the Internet. Do the users looking for that specific motorcycle care more about performances, mileage, reliability, style? Such questions are rather difficult to answer for the content creator.

Software has been developed for allowing a content creator to input one or more keywords related to a concept, in the given example for instance "motorcycle" and "caféracer", and be provided with a list of keywords relevant to that concepts and ensuring a high visibility on search engines. The working principle of such software is not relevant for the present invention and will therefore not be further discussed. An example of such software is the "Searchmetrics Suite" distributed by Searchmetrics GmbH, Greifswalder Straße 212, 10405 Berlin, Germany.

As an example, when using such software, the content creator who has to create a new page for the new café racer model may input the keywords "café racer" and "motorcycle" into said software and by provided with the following list of suggested relevant keywords, which are chosen by the software for ensuring high visibility:

"café-racer"
"Norton"
"tradition"
"Isle of Man TT"

The content creator can, based on such keywords, gather inspiration on what content may generate a high visibility on search engines and, therefore, a higher traffic on the website and increased revenues.

An issue may however arise when the content creator doesn't know what those keywords mean and can therefore not successfully integrate them in the content. In that case the content creator would usually not insert the keywords in the content, or use them wrongly, which results in a lower scoring by search engines and in a lower visibility of the content. Additionally, even in those cases where the content creator may have a basic understanding of what the keyword means, he may lack a more specific knowledge on the topic, which prevents him from correctly using the keyword in its appropriate context.

It would therefore be advantageous to provide a system capable of easily informing the content creator of the meaning of a given keyword, preferably with a short summary or description of the meaning of the keyword and relevant multimodal information of the keyword. Additionally, it would be preferable if such summary or description were to be gathered from content which has a high-ranking on search engines, such that the summary which will be presented to the content creator has already been shown to attract high traffic.

Systems are known for collecting large numbers of sentences which contain the relevant keywords. A google search for a specific keyword, for instance, can result in a large amount of sentences or images comprising the keyword. Alternatively, or in addition, a database containing a large amount of sentences, for instance created by extracting sentences from high ranking websites from Google searches, can be searched for sentences containing the relevant keyword.

The problem with this approach is that the number of sentences can be too high and the vast amount of information is impossible to process for the content creator.

Reducing the number of sentences is not an ideal solution to this problem. In fact, for instance, the database could comprise the following sentences:

S1: A café-racer is a lightweight, lightly powered motorcycle optimized for speed and handling rather than comfort—and for quick rides over short distances.

S2: A café-racer is a motorcycle that has been modified to race from a café to some other predetermined place.

S3: The Modern Motorcycle Company is a custom workshop based in Melbourne, Victoria which specializes in café-racer.

S4: Tom Cruise owns several motorcycles including a Vyrus 987 C3 4V worth over $100,000 and a number of café-racer.

Here, a simple keyword search would result in all four sentences being shown to the content creator, while it is obvious that S1 and S2 provide more useful information to the content creator wishing to understand what a café-racer is. Removing S3 and S4 from the database may not be an acceptable solution as those sentences may be highly relevant for other keywords, for instance when searching information about "The Modern Motorcycle Company" and "Tom Cruise" respectively.

While the above example is based on only four sentences, practical databases containing text from highly ranked websites may contain a much higher number of sentences, sometimes millions or more of them. Showing all results comprising a given keyword provides too much information, most of which is not relevant.

A method is therefore needed to identify those sentences and/or description of images which are relevant to the given keyword and show those to the content creator. The present invention has thus been developed to solve one or more of the above-described problems.

SUMMARY OF THE INVENTION

The present invention generally relies on the principle that, for any given keyword, a search on one or more textual and semantic matching or ranking technology, such as search engines, can be carried out resulting in a plurality of text information which relate to the content. The invention then provides a method for effectively summarizing such large amount of text into a manageable text amount, in an automated manner.

The invention furthermore ensures that the automatic summary which is generated comprises the most relevant information from the larger text amount, and/or generated text from images around the text. so that only the quantity of the text is compressed, but not the quality of the information provided to the content creator.

In particular, an embodiment of the invention can relate to a method for summarizing content related to a keyword, the content being retrieved from online websites, the method comprising the steps of: searching the keyword with at least one search engine, thereby obtaining ranked result webpages, deriving sentences from a predetermined number of highest ranking webpages, among the ranked result webpages, combining the sentences, thereby obtaining a combined content, ranking the combined content, thereby obtaining a ranked content, outputting a predetermined number of highest ranking sentences from the ranked content as summary of the keyword.

Thanks to this approach it is possible to output a number of relevant sentences, meaning that they contain information relevant to the keyword that has been inputted as input for the search, while at the same time ensuring that those sentences are automatically derived from a high-quality content, which ensures high-ranking results from search engines.

In some embodiments, the predetermined number can be the 20 highest ranking webpages, preferably the 10 highest ranking webpages, even more preferably the 5 highest ranking webpages.

Thanks to this approach the quantity of sentences is sufficient for creating a quality summary while containing the processing power needed for performing the method.

In some embodiments, the number of sentences can be higher than 50, preferably higher than 100, even more preferably higher than 500.

In some embodiments, the deriving step can comprise associating sentences to an image or a video from the ranked result webpages.

Thanks to this approach it is advantageously possible to also make use of information collected from images, converted into text.

In some embodiments, the step of associating can comprise the steps of converting the image or one or more frames of the video, into a vector of a semantic space relevant to the keyword, and associating a text corresponding to a most similar of previously analyzed images and/or videos to the converted image or one or more frames of the video based on a vector distance operation, wherein the vector distance operation comprises selecting as the most similar of previously analyzed images and/or videos the one having a shortest vector distance to the converted image or one or more frames of the video.

Thanks to this approach it is advantageously possible to automatically convert images and/or videos from the ranked result webpages into text, so as to use the text for the summarization of the content.

In some embodiments, the ranking step can comprise the steps of: comparing a first sentence of the combined content to all other sentences of the combined content, one by one, measuring a number of identical words for each couple of sentences, computing, for each couple of sentences, a number of single appearing words, calculating a similarity value, for each couple of sentences, as the number of identical words divided by the number of single appearing words, and calculating a similarity value for the first sentence (S1) based on the similarity values of the couples of sentences comprising the first sentence (S1).

Thanks to this approach it is possible to obtain a similarity value for the first sentence in a manner which makes an effective use of computational resources and provides good results in terms of quality of content.

In some embodiments, the step of ranking the combined content can comprise ranking the sentences based on the similarity value, wherein a higher similarity value result in a higher rank.

Thanks to this approach it is possible to quickly rank the sentences within the combined content, thus allowing the higher ranked sentences to be extracted as summary for the keyword.

In some embodiments, the ranking step can comprise the steps of: evaluating a frequency of words from sentences of the combined content, on a sentence by sentence basis, thereby outputting a plurality of vectors, each vector comprising evaluated frequencies for each sentence, grouping the plurality of vectors into a matrix, decomposing the matrix into a first component matrix, a second component matrix, and a third component matrix, wherein the matrix results from the multiplication of the first component matrix by the second component matrix and by the third component matrix, wherein the first component matrix corresponds to unit vectors of the matrix, wherein the second component matrix is a diagonal matrix, wherein the third component matrix corresponds to unit vectors of the matrix, computing a ranking score based on the second component matrix.

Thanks to this approach it is possible to automatically provide a method which ranks large amount of text in a reliable and efficient manner, in terms of computational resources used.

In some embodiments, the computing step can comprise the steps of: calculating a ranking score S for each of the sentences according to $$S_k = \sqrt{\frac{\sum_{i=1}^{n} u_{k,i}^2 \cdot \sigma_i^2}{\text{length}(S_k)}}$$

wherein n is a number of sentences in the combined content, and $$s_k = S_k \cdot \sum_{i=0, i \neq k}^{n} wmd(k, i)/n$$

wherein WMD represents a word moving distance operation.

Thanks to this approach it is possible to automatically provide a method which ranks large amount of text in a reliable and efficient manner, in terms of computational resources used.

SHORT DESCRIPTION OF THE FIGURES

Figure 2:
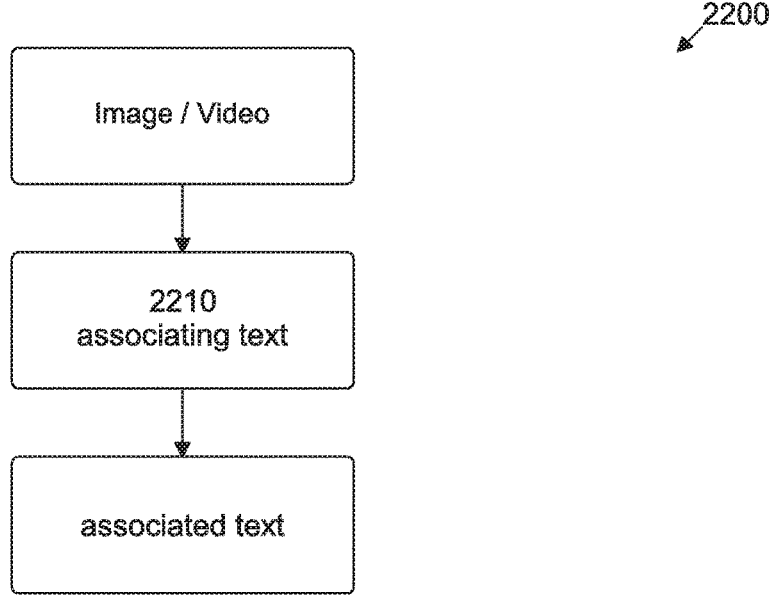
Figures 3, 4, 5:
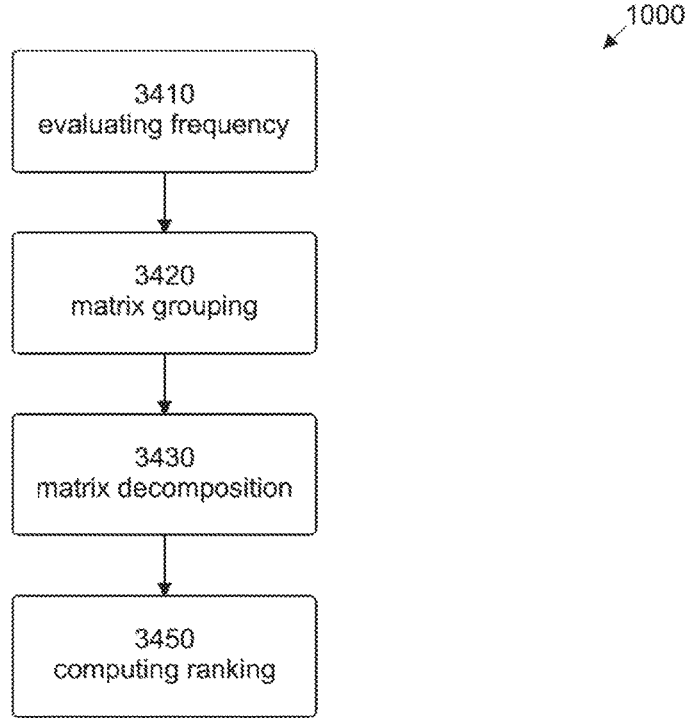

FIG. 1 schematically illustrates a method 1000 for summarizing content according to an embodiment of the invention, FIG. 2 schematically illustrates an implementation of an associating step 2200, FIG. 3 schematically illustrates an implementation of a ranking step 3400, FIG. 4 schematically illustrates a matrix X resulting from a grouping step 3420, FIG. 5 schematically illustrates a matrix decomposition step 3430, FIG. 6 schematically illustrates a computing step 3450.

DETAILED DESCRIPTION OF PREFERRED EMBODIMENTS

FIG. 1 schematically illustrates a method 1000 for summarizing content according to an embodiment of the invention. The method 1000 allows summarizing content related to a keyword, the content being retrieved from online websites. The keyword can be a single word or a combination of words, eventually comprising logic operators such as, for instance, NOT, AND, OR, etc. In the following, for ease of description, all those possible cases will be simply referred to as "keyword".

The method 1000 comprises a step 1100 of searching the keyword with at least one search engine, thereby obtaining ranked result webpages. The at least one engine can be, for instance, Google, Bing, Yandex, etc. As it is known in the art, searching of a keyword with a search engine generally results in a plurality of webpages, which are usually ranked in term of their quality and/or relation to the keyword, and/or visibility. The ranking algorithms of the different search engines are proprietary information of those search engines but it can be generally assumed that higher ranking websites provide better quality information with respect to the keyword than lower ranking websites. The ranking is generally achieved by the graphical presentation of the results from the search engine, whereby the websites resulting from the search are presented in a webpage as a list, one below the other, where the ranking decreases toward the bottom of the webpage.

The method further comprises a step 1200 of deriving sentences from a predetermined number of highest ranking webpages, among the ranked result webpages. Here the predetermined number can be preferably the 20 highest ranked websites, more preferably the 10 highest ranked websites, even more preferably the 5 highest ranked websites. Those numerical values have been found by the inventors after examining a large amount of data to ensure a quantity of sentences which are sufficient for creating a quality summary while containing the processing power needed for performing the method. In some embodiments, the number of sentences can be higher than 50, preferably higher than 100, even more preferably higher than 500.

In some embodiments, the sentences derived in the deriving step can be those sentences which are reported in the webpage of the search engine as a result of the search. It is in fact often the case that the search engines report, below the link of the webpage identified in the search, a short text description of the content of the link. In alternative, or in addition, the method can open the webpages corresponding to the links resulting from the search and retrieve the text content of those webpages. Alternatively, or in addition, the text content of those webpages can be searched for sentences containing the keyword which was searched on the search engine and those sentences containing the keyword can be outputted as result of the deriving step 1200.

Still alternatively, or in addition, as illustrated in FIG. 2, the step 1200 can further comprise a step 2200. This is particularly advantageous in those cases in which the webpages corresponding to the links resulting from the search contain images and/or videos. Since images and/or videos cannot be summarized per se, the step 2200 allows their content to be converted into text by an associating step 2210, in which sentences are associated to an image or a video from the ranked result webpages, thereby resulting into associated text. The associated text can then be further processed by the method 1000 as any other text retrieved from the ranked webpages.

The associating step 2210 can be implemented in several known manners. One possible example is provided at the address https://research.googleblog.com/2016/09/show-and-tell-image-captioning-open.html, which is herewith enclosed in its entirety.

In general however, the associating step 2210 can be obtained by converting the image, or one or more frames of the video, into a vector of a semantic space relevant to the keyword, so as to allow the comparison of the resulting vector to a plurality of vectors resulting from previously analyzed images and/or videos, the content of which has already been transferred in text form. The image and/or video subject of the associating step 2210 can then the associated to a text corresponding to the most similar of the previously analyzed images and/or video, or to a combination of the text description of a predefined number of the most similar previously analyzed images and/or video. The similarity can be based on a vector distance operation performed on the vector resulting from the image and/or video subject of the associating step 2210 and the vectors resulting from the previously analyzed images and/or video. In particular, the shorter the distance among the vectors, the more similar are the respective media content.

The method further comprises a step 1300 of combining the sentences, thereby obtaining a combined content. Here the sentence are those which are obtained from the webpage listing the results of the search, and/or those crawled from the webpages corresponding to the result of the search, and/or those obtained by the associating step S2210. The combination step thus takes all the sentences output by the deriving step 1200 and combines them into a single data structure, for instance a file or a database, for further processing.

In some embodiments a preprocessing step may be carried out on the text resulting from combining step 1300. The purpose of the preprocessing step is to generally clean the text from elements which are not relevant for the summarization of the text as well as reducing the computational resources needed to perform method 1000.

In some embodiments of the preprocessing step any of the following may be removed from the text:

stopwords such as, when considering English as an example, "a, about, above, after, again, against, all, am, an, and, any, are, aren't, as, at, be, because, been, before, being, below, between, both, but, by, can't, cannot, could, couldn't, did, didn't, do, does, doesn't, doing, don't, down, during, each, few, for, from, further, had, hadn't, has, hasn't, have, haven't, having, he, he'd, he'll, he's, her, here, here's, hers, herself, him, himself, his, how, how's, I, I'd, I'll . . . etc." as listed, for instance, at http://www.ranks.nl/stopwords, the content of which is herewith incorporated by reference. It will be clear that the list of stopwords can be language dependant;

words with has less than 2 characters;

characters that are not alphanumeric, such as %, &, + and § ;

punctuation signs such as , . and;

Moreover, in some embodiments of the preprocessing step, any of the following transformations may be carried out:

converting all characters into their lowercase form, converting all accented characters into their unaccented form.

The text, or combined content, resulting from the combining step 1300 is then inputted to a ranking step 1400, thereby obtaining a ranked content. The ranking step generally allows the various sentences of the combined content to be ranked in terms of quality of their respective information. By ranking the sentences in this manner, a summarization can then be performed by selecting a predetermined number of the highest ranking sentences.

The method 1000 further comprises an outputting step 1500 for outputting a predetermined number of highest ranking sentences from the ranked content as summary of the keyword. In this manner a summarized content can be outputted from the method 1000, which is based on high ranking search results thereby ensuring traffic and visibility on search engines of the content created based on the information available in the summary. The predetermined number could be, for instance, the 50 highest ranked sentences, preferably the 30 highest ranked sentences, even more preferably the 10 highest ranked sentences.

Several manners are known for computing a similarity value of a sentence with respect to a group of other sentence and any of them may be applied to implement the ranking step 1400. One possible embodiment will be described in the following considering the output of the combining step 1300 as comprising N sentences S1 to SN:

S1: A café-racer is a lightweight, lightly powered motorcycle optimized for speed and handling rather than comfort—and for quick rides over short distances.

S2: A café-racer is a motorcycle that has been modified to race from a café to some other predetermined place.

. . . .

SN: The Modern Motorcycle Company is a custom workshop based in Melbourne, Victoria which specializes in café-racer.

It will be clear that a similarity value can be computed for each sentence, while in the following for practical purposes it will be shown how to compute it with reference to a specific sentence in the example above, namely S1.

Firstly, sentence S1 is compared, one by one, to all other sentences for identifying identical words and the number of identical words per each couple of sentences is measured. For instance, for the couple S1-S2, the following words are identical <a, café-racer, is, motorcycle> resulting in a total number of identical words per couple, here 4 for S1-S2. For instance, for the couple S1-SN, the total number of identical words is 1, namely <motorcycle>.

Secondly, for each couple of sentences, the number of single appearing words is computed. Single appearing words are defined as all words appearing in the two sentences of the couple, without counting their repetition. For instance, 51 has 20 single words, namely <a, café-racer, is, lightweight, lightly, powered, motorcycle, optimized, for, speed, and, handling, rather, than, comfort, quick, rides, over, short, distances> while S2 has 12, namely <that, has, been, modified, to, race, from, café, some, other, predetermined, place>, since for instance the word <a> already appears in S1. In the case of S1-S2, the number of single appearing words thus corresponds to 32. For the couple S1-SN this value is also 32.

Afterward, a similarity value is calculated for each couple as the number of identical words per each couple divided by the number of single appearing words per couple. In the case of S1, this means 4/32, for the couple S1-52 and 1/32 for the couple S1-SN.

Finally, the plurality of similarity values for a single sentence are averaged, or alternatively are summed together, to provide a single similarity value for a given sentence. In the case of S1, with reference to the example above, if only sentences S1, S2 and SN are considered, the single similarity value for S1 could be computed as the average of 4/32 and 1/32, thus 5/64, or as the sum of 4/32 and 1/32, thus 5/32.

The similarity value thus computed for each sentence S1 . . . SN can thereafter be used for ranking the sentences, namely ranking higher those sentences which have a higher similarity value.

FIG. 3 schematically illustrates an implementation of a ranking step 3400 which, in some embodiments, may implement the ranking step 1400.

As can be seen in FIG. 3, the ranking step 3400 comprises a step 3410 for a frequency of words from sentences of the combined content, on a sentence by sentence basis, thereby outputting a plurality of vectors $d_1$-$d_n$, each vector comprising evaluated frequencies for each sentence. That is, the frequency of words within a given sentence is counted and the respective sentence is represented a vector of the term frequencies. For instance, when processing the sentence "US envoy a week before Mike Pence reaffirmed a US commitment" the result would be

| a | week | mike | envoy | commitment | us | pence | reaffirmed | before |
|---|------|------|-------|------------|----|----|-----------|--------|
| 2 | 1 | 1 | 1 | 1 | 2 | 1 | 1 | 1 | thus resulting into vector d:[2 1 1 1 1 2 1 1 1] comprising elements $x_1$ to $x_m$.

When applied to the entire combined content, the evaluating step 3410 therefore results into a plurality of vectors $d_1$-$d_n$, for a number of sentences equal to n. The ranking step 3400 further comprises a step 3420 of grouping the plurality of vectors $d_1$-$d_n$ into the matrix X, such as illustrated in FIG. 4.

In a further decomposing step 3430 of the ranking step 3400, the matrix X is decomposed into a first component matrix U, a second component matrix $\Sigma$, and a third component matrix $V^T$, such as schematically illustrated in FIG. 5. In particular, as visible in FIG. 5, the matrix X results from the multiplication of the first component matrix U by the second component matrix $\Sigma$ and by the third component matrix $V^T$.

The first component matrix U corresponds to unit vectors of the matrix X, calculated on a line basis, as visible from the indication of ($^\frown t_i^T$) on the left side of component matrix U. The second component matrix $\Sigma$ is a diagonal matrix. The third component matrix $V^T$ corresponds to unit vectors of the matrix X, calculated on a column basis, as visible from the indication of ($^\frown d_j$) on the top side of component matrix $V^T$ The ranking step 3400 further comprises a step 3450 of computing a ranking score S based on the second component matrix $\Sigma$. In particular, the second component matrix $\Sigma$ depends on the frequency characteristics of the combined content. Thanks to this characteristic of the second component matrix $\Sigma$, it is possible to extract from it the most relevant sentences from the combined content.

In particular, in some embodiments, the computing step can be obtained by the operations indicated as (Eq. 1) and (Eq. 2) in FIG. 6.

More specifically, in a first step a ranking score S is computed for each of the sentences according to $$S_k = \sqrt{\frac{\sum_{i=1}^{n} u_{k,i}^2 \cdot \sigma_i^2}{\text{length}(S_k)}}$$

wherein "n" is a number of sentences in the combined content. Subsequently, a ranking $$s_k = S_k \cdot \sum_{i=0, i \neq k}^{n} wmd(k,i)/n$$

wherein "wmd" represents a word moving distance operation which is described by, for instance, the article "From Word Embeddings To Document Distances" by Matt J. Kusner, Yu Sun, Nicholas I. Kolkin and Kilian Q. Weinberger, Proceedings of the 32 nd International Conference on Machine Learning, Lille, France, 2015. JMLR: W&CP volume 37, which is herewith incorporated in its entirety.

In some embodiments, the word moving distance operation can be based on word embedding model trained on the top relevant results from Google.

Alternatively sentence embedding like doc2vec (Distributed Representations of Sentences and Documents Quoc V. Le, Tomas Mikolov https://arxiv.org/abs/1405.4053) can used to measure the similarity between sentences.

In some embodiments the sentences extracted at deriving step 1200 can be difficult to process in further steps, since very often the various sentences extracted miss punctuation. For instance, when extracting sentences from a website with a title "The world of café racers", a subtitle "Exploring custom made motorcycles all over the world" and a text in the page starting with "This website is dedicated to all those people passionate about café-racers." there is a risk that the deriving step may interpret only the last punctuation sign as the end of the single sentence "The world of café racers Exploring custom made motorcycles all over the world This website is dedicated to all those people passionate about café-racers." That is, while the visual formatting of a page allows a human reader to recognize the different sentences even in the absence of punctuation signs, a software may not be capable of recognizing them. In some case, the software analyzing the sentences may also have no information about their original position in the website.

Such sentences may cause a malfunctioning of the combining step 1300 and/or of the ranking step 1400. To avoid this issue, it is possible to remove such sentences from the corpus by using algorithms which recognize the quality of sentences and can act to remove low quality sentences. Examples of such algorithms are provided in U.S. patent application Ser. No. 15/863,408, which is herewith enclosed in its entirety. This step can be carried out before the combining step 1300 or before the ranking step 1400.

As an alternative approach, it is possible to use sentence compression technologies to extract essential meaning parts and significantly remove the length of long sentences. Sentence compression is a known natural language processing task and can be implemented in several manners, known to the skilled person. As an example, the method described by document "Sentence Compression by Deletion with LSTMs" by Katja Filippova, Enrique Alfonseca, Carlos A. Colmenares, Lukasz Kaiser, Oriol Vinyals, of Google Research, which is also herewith enclosed in its entirety.

Thanks to the present invention it is thus possible to automatically reduce large text contents into a more manageable amount, which allows the content creator to access meaningful information relating to a keyword, whereby the information has also been provided from highly ranked websites, such that its use by the content creator will also likely result in the content being highly ranked by the various search engines.

LIST OF REFERENCE NUMERALS

FIG. 1
1000: method for summarizing content
1100: searching step
1200: deriving step
1300: combining step
1400: ranking step
1500: outputting step
FIG. 2
2200: deriving step
2210: associating step
FIG. 3
3400: ranking step
3410: frequency evaluation
3420: matrix grouping
3430: matrix decomposition
3450: computing ranking

The invention claimed is:

1. A method for summarizing content related to a keyword, the content being retrieved from online websites, the method comprising the steps of:
    searching the keyword with at least one search engine, thereby obtaining ranked result webpages,
    deriving sentences from a predetermined number of highest ranking webpages, among the ranked result webpages,
    combining the sentences, thereby obtaining a combined content,
    ranking the combined content, thereby obtaining a ranked content,
    outputting a predetermined number of highest ranking sentences from the ranked content as summary of the keyword; wherein the ranking step comprises the steps of:
    evaluating a frequency of words from sentences of the combined content, on a sentence by sentence basis, thereby outputting a plurality of vectors each vector comprising evaluated frequencies for each sentence,
    grouping the plurality of vectors into a matrix,
    decomposing the matrix into a first component matrix, a second component matrix, and a third component matrix,
        wherein the matrix results from the multiplication of the first component matrix by the second component matrix and by the third component matrix,
        wherein the first component matrix corresponds to unit vectors of the matrix,
        wherein the second component matrix is a diagonal matrix, wherein the third component matrix corresponds to unit vectors of the matrix, computing a ranking score based on the second component matrix.

\* \* \* \* \*